(12) United States Patent
Sallie et al.

(10) Patent No.: US 6,532,951 B1
(45) Date of Patent: Mar. 18, 2003

(54) INDOOR/OUTDOOR BARBECUE COOKER

(76) Inventors: Clyde T. Sallie, 2321 Kent Blvd. NE., Grand Rapids, MI (US) 49503; Annie M. Sallie, 2321 Kent Blvd. NE., Grand Rapids, MI (US) 49503; Mona L. Sallie, 2321 Kent Blvd. NE., Grand Rapids, MI (US) 49503; Kristi A. Sallie, 2321 Kent Blvd. NE., Grand Rapids, MI (US) 49503

( * ) Notice: Subject to any disclaimer, the term of this patent is extended or adjusted under 35 U.S.C. 154(b) by 0 days.

(21) Appl. No.: 09/716,714

(22) Filed: Nov. 20, 2000

(51) Int. Cl.[7] .............................. F24B 1/182; A47J 33/00
(52) U.S. Cl. ............................................ 126/506; 126/9 R
(58) Field of Search ............................... 126/505, 506, 126/9 R, 29, 30

(56) References Cited

U.S. PATENT DOCUMENTS

| | | |
|---|---|---|
| 2,960,979 A | 11/1960 | Stone |
| 3,224,357 A | 12/1965 | Rubens |
| 3,311,105 A | 3/1967 | Bergel et al. |
| 3,610,225 A * | 10/1971 | Schwantes ................. 126/9 R |
| 3,630,188 A | 12/1971 | Ross |
| 3,952,721 A | 4/1976 | Patterson |
| 4,036,205 A | 7/1977 | Hayes |
| 4,068,649 A | 1/1978 | Johnson |
| 4,074,679 A | 2/1978 | Jensen |
| D250,419 S | 11/1978 | Luscombe |
| D250,718 S | 1/1979 | Koster |
| 4,141,336 A | 2/1979 | Fitch |
| D251,385 S | 3/1979 | Zimmer |
| 4,157,704 A | 6/1979 | Zimmer |
| D252,281 S | 7/1979 | Kincaid |
| D253,804 S | 1/1980 | Wandel |
| 4,196,714 A | 4/1980 | Fromman |
| 4,210,119 A | 7/1980 | Kincaid |
| 4,214,569 A | 7/1980 | Heine |
| D257,280 S | 10/1980 | Sands |
| 4,240,403 A | 12/1980 | Bader |
| 4,254,756 A | 3/1981 | Wells |
| D266,865 S | 11/1982 | Pierce |
| 4,374,514 A | 2/1983 | Pierce |
| 4,386,599 A | 6/1983 | Berryhill |
| 4,414,957 A | 11/1983 | Evans |
| 4,436,080 A | 3/1984 | Evans |
| 4,457,290 A * | 7/1984 | Edwards ..................... 126/9 R |
| 4,503,836 A | 3/1985 | Evans |
| 4,553,528 A | 11/1985 | Wells |
| D281,716 S | 12/1985 | Aseltine |
| 4,569,327 A * | 2/1986 | Velten ........................ 126/9 R |
| 4,878,476 A * | 11/1989 | Oliphant ..................... 126/9 R |
| D311,441 S | 10/1990 | Greene |
| D313,070 S | 12/1990 | Greene |
| 5,303,692 A | 4/1994 | Shasad |

* cited by examiner

Primary Examiner—Sara Clarke
(74) Attorney, Agent, or Firm—Price, Heneveld, Cooper DeWitt & Litton

(57) ABSTRACT

A portable cooking apparatus is provided that comprises a bottom plate sized to receive a tray receptacle. A first wall, a second wall, and a third wall are each attached to the bottom plate, with the first wall and the second wall on opposite sides of the bottom plate. The portable cooking apparatus further includes at least one support bar on each of the first and second walls for supporting a grate thereon. A grate rests on the support bars and a tray receptacle is located above the bottom, below the cooking grate and between the first wall and the second wall. The portable cooking apparatus is sized to be received in a fireplace and adapted to be portable and usable outdoors.

14 Claims, 4 Drawing Sheets

INDOOR/OUTDOOR BARBECUE COOKER

BACKGROUND OF THE INVENTION

This invention relates to barbecue cookers, and in particular to barbecue cookers that can be used both indoors and outdoors.

Barbecue cookers are typically made strictly for outdoor use or strictly for indoor use. Most barbecue cookers are very heavy and awkward to move, making their portability very limited. The portable barbecue cookers that are portable are usually very small, restricting the amount and type of food that can be cooked at one time. There is a desire for a cooking apparatus that can be used both indoors, such as in an indoor fireplace, and outdoors.

SUMMARY OF THE INVENTION

One aspect of the present invention is a portable cooking apparatus comprising a bottom plate sized to receive a tray receptacle, a first wall, a second wall, and a third wall, each attached to the bottom plate, with the first wall and the second wall on opposite sides of the bottom plate. The portable cooking apparatus further includes at least one support bar on each of the first and second walls for supporting a grate thereon. A grate rests on the support bars and a tray receptacle is located above the bottom plate, below the cooking grate and between the first wall and the second wall. The portable cooking apparatus is sized to be received in a fireplace and adapted to be portable and usable outdoors.

Another aspect of the present invention is a portable cooking apparatus comprising a bottom plate having a top, a bottom, a front, a back, a first side, and a second side. The portable cooking apparatus further comprises a first wall attached to the bottom plate by a first hinge, where the first wall is adjacent to the first side of the bottom plate. A second wall is attached to the bottom plate by a second hinge, and the second wall is adjacent to the second side of the bottom plate. A third wall is attached to the bottom plate by a third hinge, and the third wall is adjacent to the back of the bottom plate and is also attached to the first wall and the second wall. The portable cooking apparatus further includes at least one support bar on each of the first wall and the second wall for supporting a cooking grate, and at least one cooking grate rests on each of the support bars on each of the first wall and the second wall. The first wall can be folded at the first hinge over the bottom plate, the third wall can then be folded at the third hinge over the first wall, and the second wall can be folded at the second hinge over the third wall so the cooking apparatus can be folded down for easy portability.

These and other features and advantages of the present invention will be further understood and appreciated by those skilled in the art by reference to the following specification, claims and appended drawings.

DETAILED DESCRIPTION OF THE PREFERRED EMBODIMENTS

Figure 4:
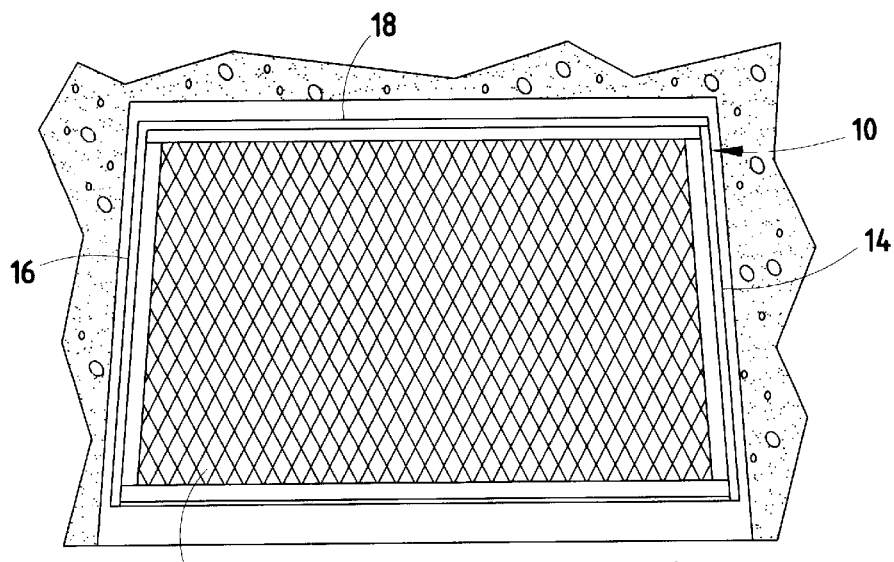
FIG. 4 is a top plan view of the cooking apparatus of FIG. 1 in a fireplace.

For purposes of description herein, the terms "upper," "lower," "right," "left," "rear," "front," "vertical," "horizontal," and derivatives thereof shall relate to the invention as oriented in FIG. 4, the top of the cooker facing out from the printed page. However, it is to be understood that the invention may assume various alternative orientations, except where expressly specified to the contrary. It is also to be understood that the specific devices and processes illustrated in the attached drawings, and described in the following description, are simply exemplary embodiments of the inventive concepts defined in the appended claims. Hence, specific dimensions or other physical characteristics relating to the embodiments disclosed herein are not to be considered as limiting, unless the claims expressly state otherwise.

Figure 2:
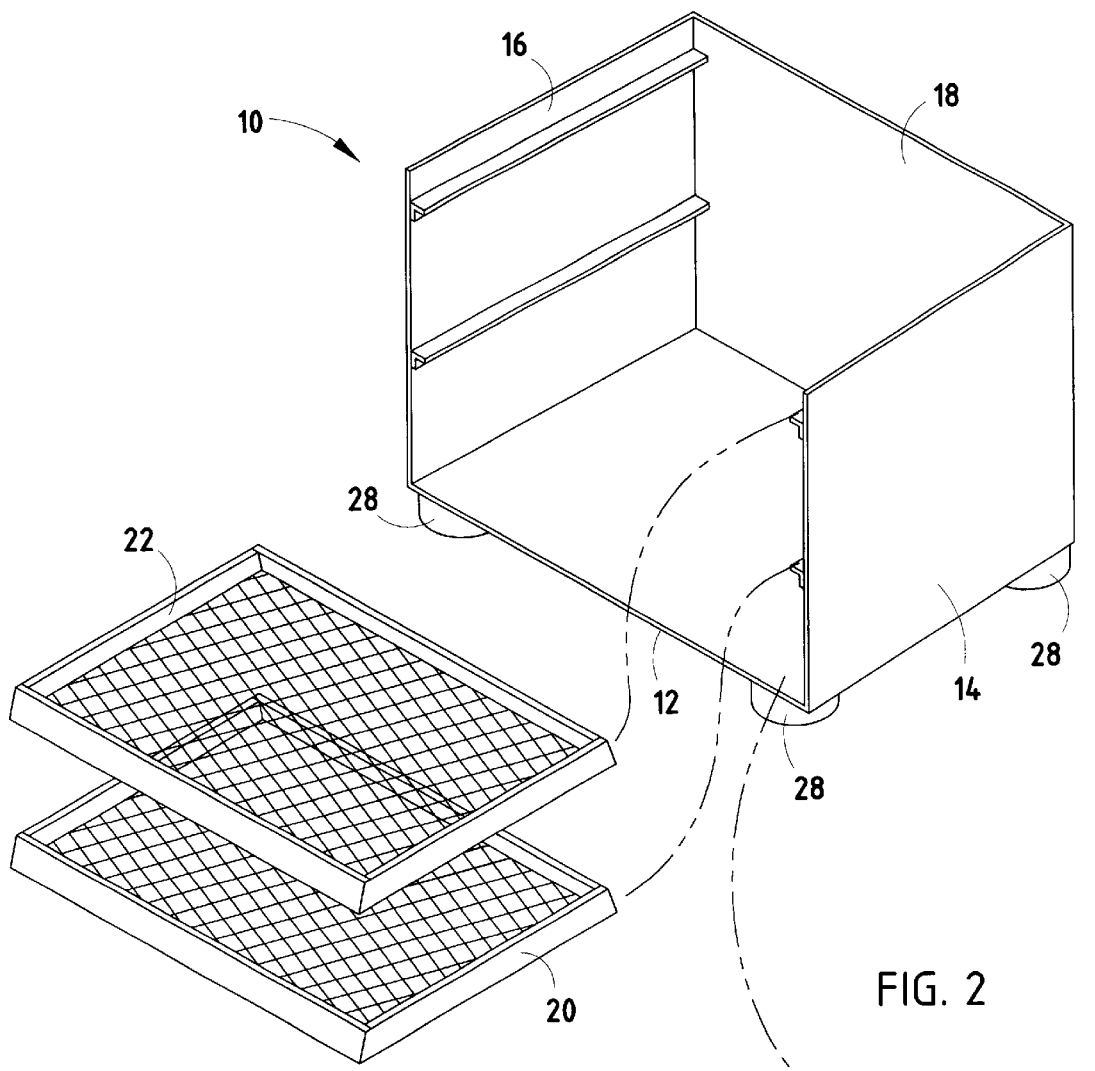
FIG. 2 is an exploded perspective view of the cooking apparatus of FIG. 1.
Figure 2:
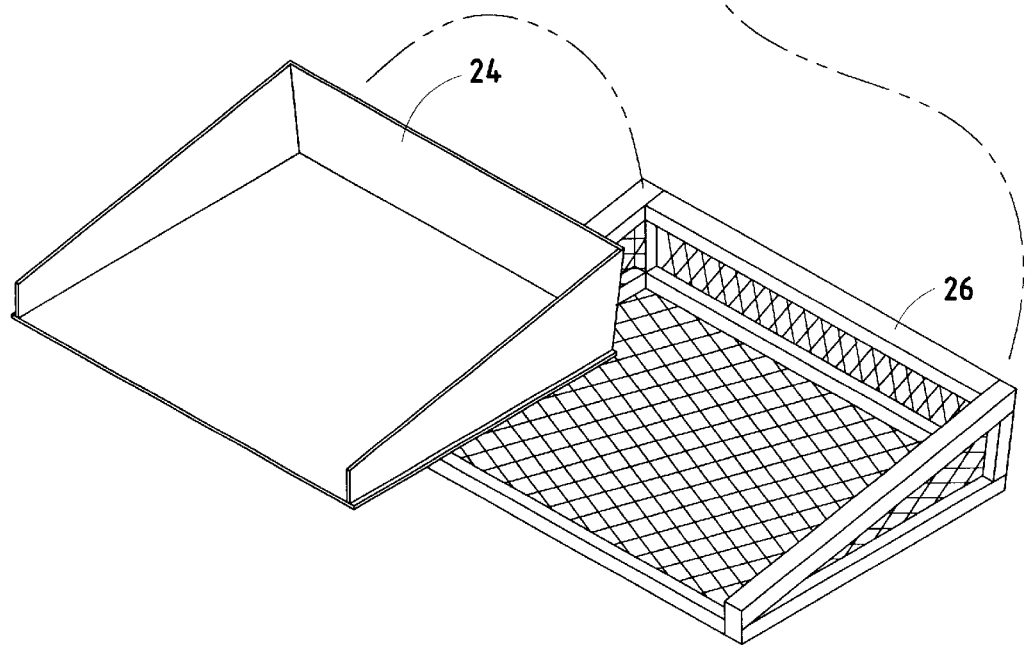

The cooking apparatus 10 of the present invention generally includes a bottom plate 12, a first wall 14, an optional temperature gauge 15, a second wall 16, a back wall 18, a first grate 20, a second grate 22, and a tray receptacle 24. FIG. 2 shows the parts of the cooker 10, which are all preferably made of metal, and more preferably made of a light-weight tempered steel for durability and ease of portability. As shown in FIG. 2, the cooking apparatus 10 also includes a bottom receiving grate 26 and feet 28. Feet 28 are attached to the underside of bottom plate 12. In this embodiment, walls 14, 16, and 18 are fixedly attached to bottom plate 12, preferably by welding them together.

Figure 1:
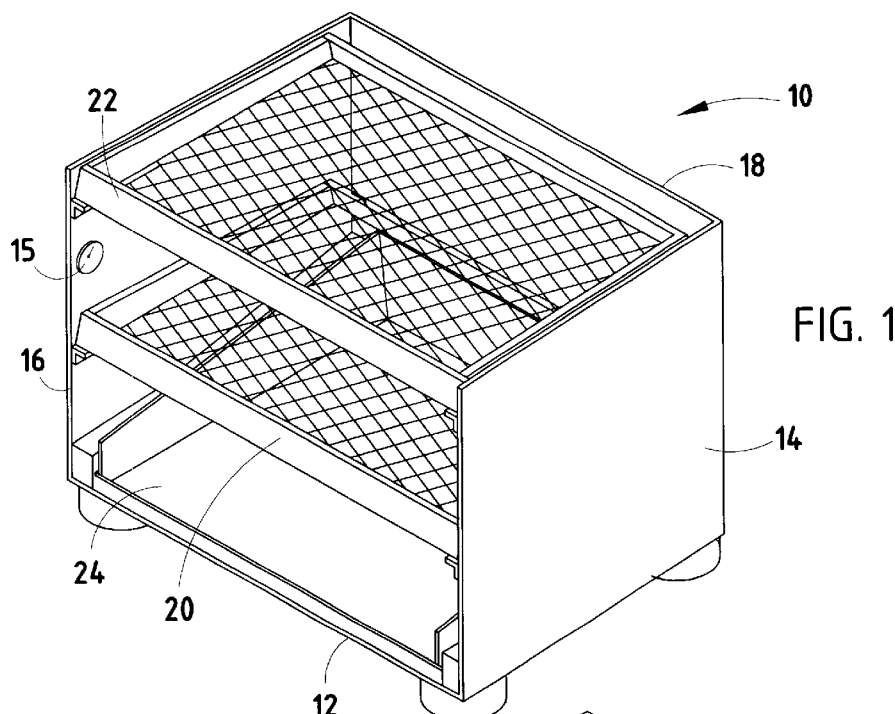
FIG. 1 is a perspective view of the cooking apparatus of the present invention.
Figure 3:
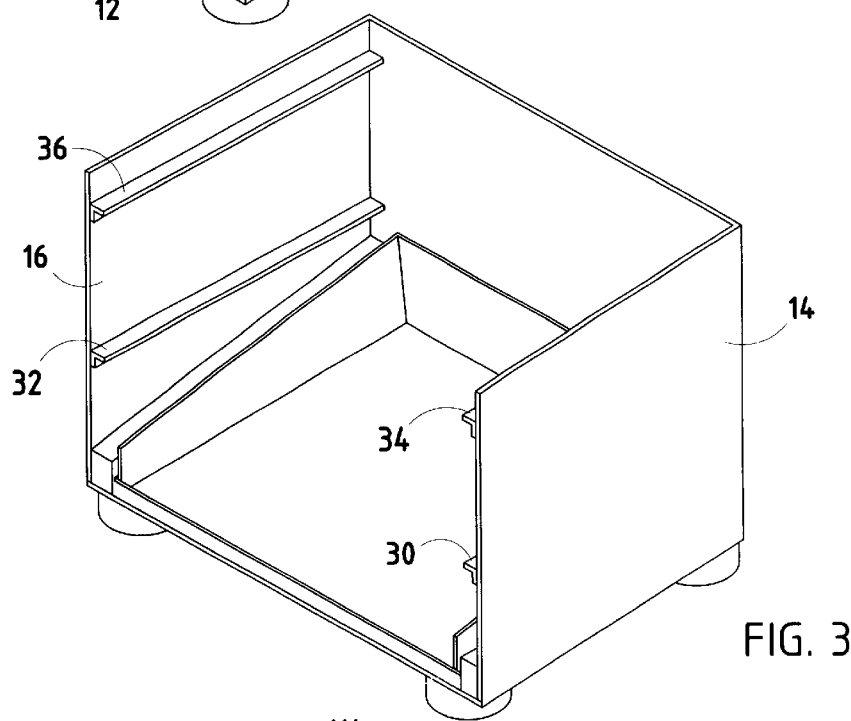
FIG. 3 is a perspective view of the cooking apparatus of FIG. 1 without grates.

As seen in FIG. 3, first wall 14 and second wall 16 each include support bars. Support bar 30 on first wall 14 and support bar 32 on second wall 16 are at the same vertical level so that grate 20 can sit evenly thereon as shown in FIG. 1. Support bar 34 on first wall 14 and support bar 36 on second wall 16 serve the same purpose as support bars 30 and 32 for the upper grate 22. Grates 20 and 22 are removable from the cooking apparatus 10 for cleaning or replacement. Supports 30, 32, 34, and 36 are also preferably "L"-shaped, made of steel, and welded to the walls. It is contemplated that the supports 30, 32, 34, and 36 may be adjustable vertically, thus allowing the user to set the grates at different heights in the cooking apparatus when different cooking temperatures and configurations are desired. It is also contemplated that a single grate or more than two grates can be used in the cooking apparatus.

Bottom receiving grate 26 sits atop bottom plate 12 and fits snugly between walls 14, 16, and 18. Bottom receiving grate 26 receives tray receptacle 24, which fits tightly within bottom receiving grate 26. Tray receptacle 24 is made of solid plate metal and is designed to hold a heating substance, such as charcoal, and to receive droppings from grates 20 and 22. Tray receptacle 24 is easily removable from the portable cooking apparatus for replacement of the heating substance and cleaning.

Walls 14 and 16, opposite one another, are shown to be in an unparallel configuration relative to each other in FIGS. 1–4. This configuration allows for ease of entry into most conventional fireplaces. The cooker may have other configurations, such as parallel first and second walls, depending on where the portable cooker is to be used and the desire of the person using the cooker.

Figure 7:
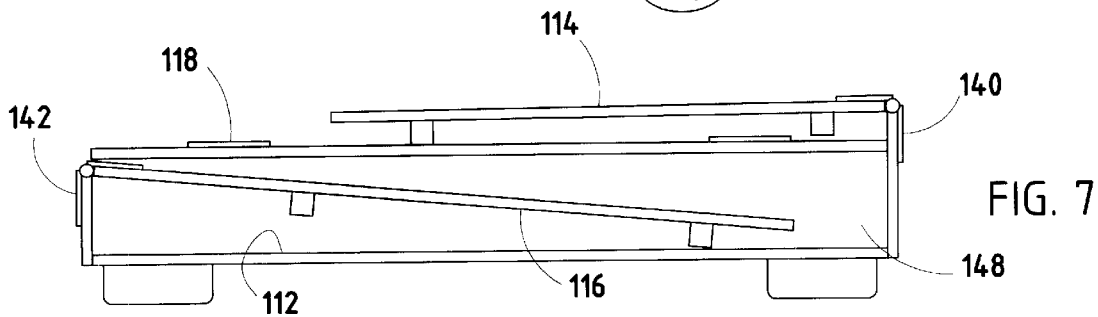
FIG. 7 is a front elevational view of the embodiment shown in FIG. 5 in a folded configuration.
Figure 5:
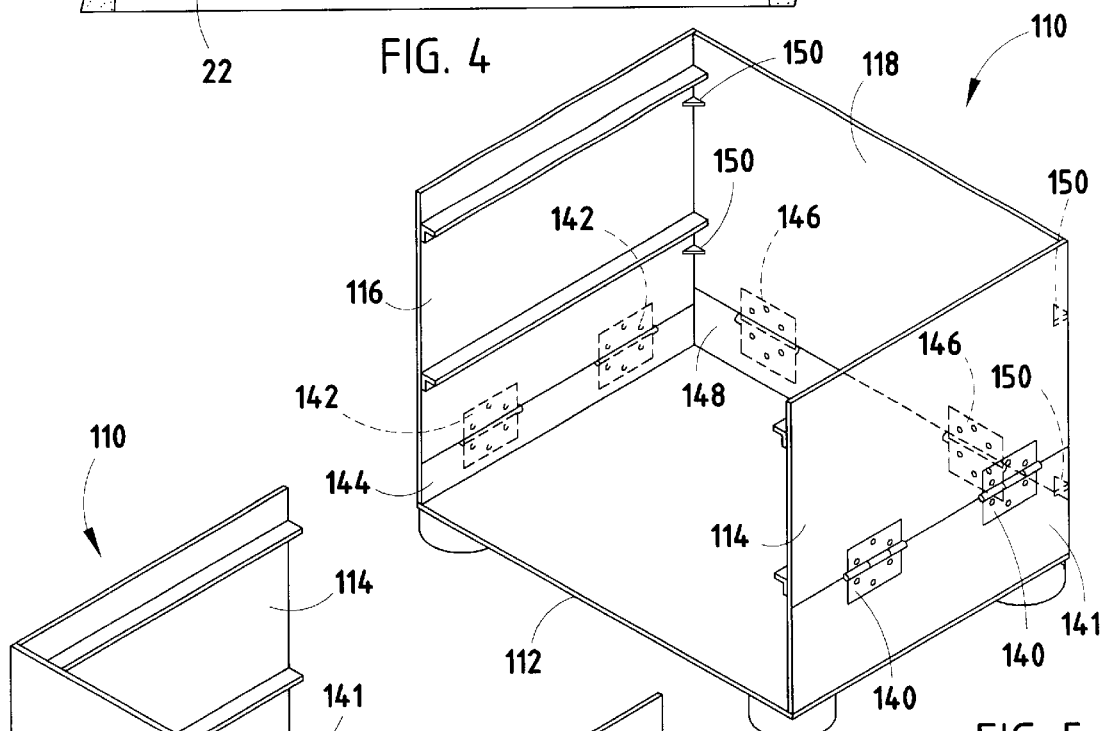
FIG. 5 is a perspective view of a second embodiment of the present invention including hinged walls.
Figure 6:
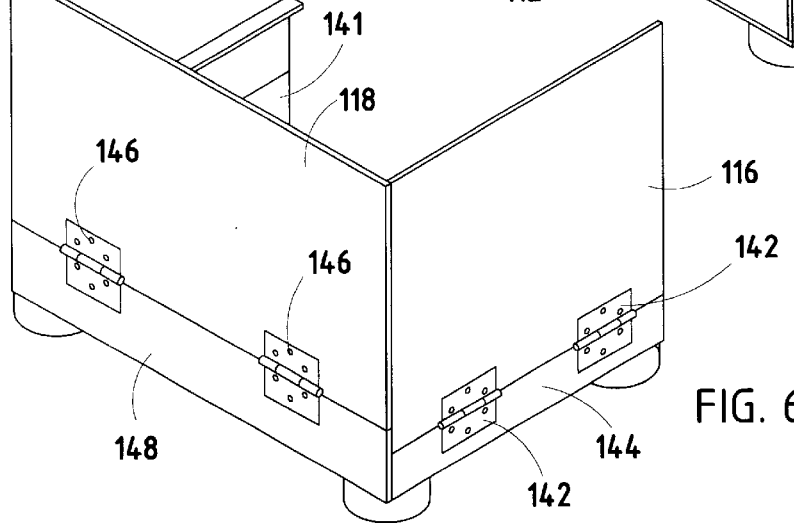
FIG. 6 is a rear perspective view of the embodiment shown in FIG. 5.

FIGS. 5–7 show a second embodiment of the present invention. Portable cooker 110 is the same in most respects to cooker 10 of the first embodiment. Portable cooker 110 includes walls 114, 116, and 118, with walls 114 and 116 being on opposite sides of each other. Wall 116 includes two hinges 142 at its bottom so that it can be folded down over the bottom plate 112. Wall 118 also has two hinges 146 that are higher vertically than hinges 142 so that the back wall 118 may be folded over wall 116. On wall 114 are two hinges 140 that are even still higher vertically than hinges 146 so that when wall 114 is folded about hinges 140, wall 114 may lay flat over back wall 118. The folding of walls 114, 116, and 118, allows the portable cooker to be folded into a flat configuration making transporting of the cooker easy. Hinges 140 attach wall 114 and bottom portion 141, hinges 142 attach together wall 116 and bottom portion 144, and hinges 146 attach together wall 118 and bottom back portion 148. Clips or pins 150 are included to hold the walls together while the cooking apparatus is in the upright position.

Figure 8:
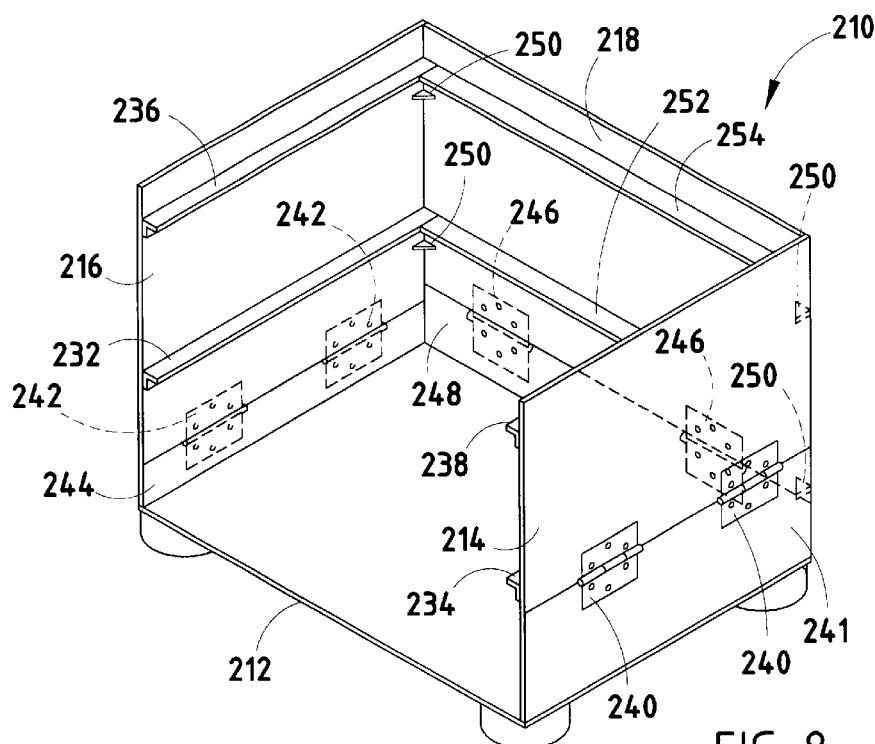
FIG. 8 is a perspective view of a third embodiment of the present invention including hinged walls and back supports.
Figure 9:
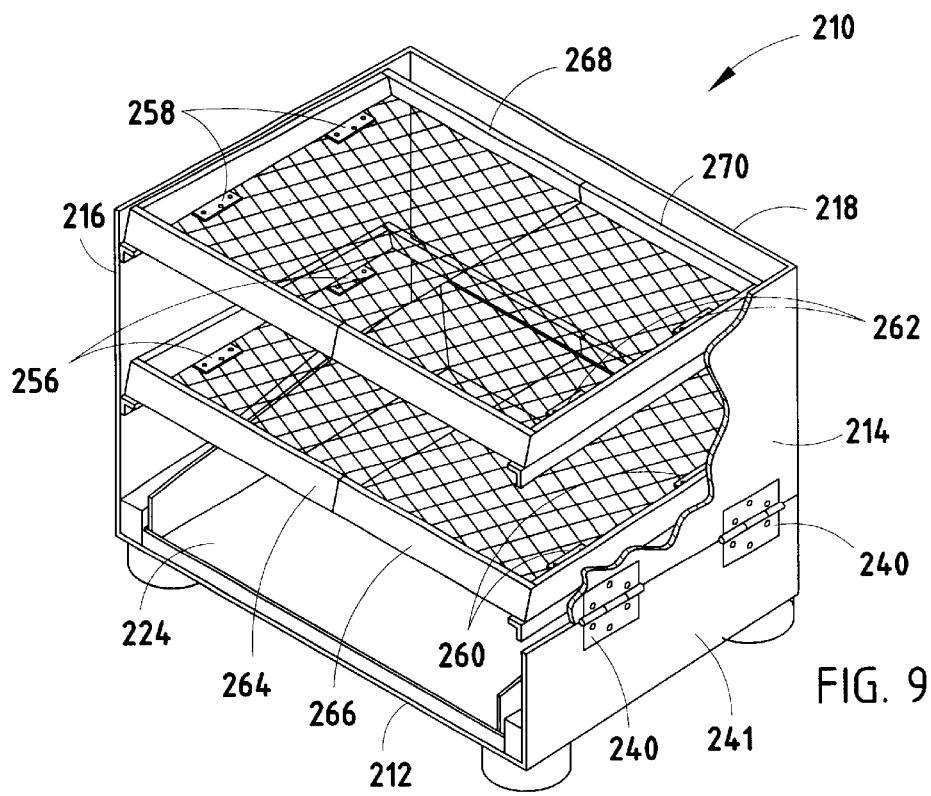
FIG. 9 is a perspective view of the embodiment shown in FIG. 8 and includes hinged grates.

In a third embodiment, shown in FIGS. 8 and 9, cooker 210 includes a bottom plate 212, a first wall 214, a second wall 216, a back wall 218, and a tray receptacle 224. Side walls 214 and 216 each have attached thereto L-shaped support bars 234 and 238 on the first wall 214 and L-shaped support bars 232 and 236 on the second wall 216. In addition, attached to back wall 218 are L-shaped supports 252 and 254, at equal vertical levels, respectively, to support bars 232, 234 and 236, 238. However, unlike the embodiments depicted in FIGS. 1–7, the embodiment in FIGS. 8 and 9 has two lower grates 264 and 266, which collectively cover the entire area of cooker 210. Grates 264 and 266 are attached to supports 232 and 234 by hinges 256 and 260, respectively. Grates 264 and 266 also rest on support 252. Grates 268 and 270 are attached to supports 236 and 238 by hinges 258 and 262, respectively. Grates 268 and 270 also rest on support 254. Clips or pins 250 stabilize and hold walls 214, 216, and 218 together when the walls are in the upright position. Wall 214 is attached to a bottom wall portion 241 by two hinges 240, wall 216 is attached to a bottom wall portion 244 by two hinges 242, and wall 218 is attached to a bottom back wall portion 248 by two hinges 246. The hinged grates allow for easy folding of the entire cooker, which allows easy mobility of the cooker.

In operation, the cooker is placed into a fireplace or outside or any other desirable location. A heating substance such as charcoal is placed in the tray receptacle 24 and ignited. Once heated, food is placed on one or more of grates 20 and 22 until the food is cooked. After cooking and removal of the food, grates 20 and 22 and tray receptacle 24 can be removed for cleaning and/or replacement. The cooker of any of the three above-described embodiments may also use gas or electricity as a heat source.

For transporting the cooker shown in FIGS. 5–7, wall 116 is folded over bottom plate 112, back wall 118 is folded over wall 116 and wall 114 is folded over back wall 118.

The above description is considered that of the preferred embodiments only. Modifications of the invention will occur to those skilled in the art and to those who make or use the invention. Therefore, it is understood that the embodiments shown above are merely for illustrative purposes and not intended to limit the scope of the invention, which is defined by the following claims as interpreted according to the principles of patent law, including the doctrine of equivalents.

The invention claimed is:

1. A portable cooking apparatus comprising:

a bottom plate having a top, a bottom, and four sides, and sized to receive a tray receptacle;

a first wall, a second wall, and a third wall, each attached to at least one side of said bottom plate, said first wall and said second wall on opposite sides of said bottom plate and not parallel relative to each other;

two support bars on each of said first wall and said second wall for supporting a grate;

at least one cooking grate resting on said support bars; and a tray receptacle above said bottom plate, below said cooking grate, and between said first wall and said second wall, the portable cooking apparatus sized to be received in a fireplace and adapted to be portable and usable outdoors.

2. The portable cooking apparatus defined in claim 1 and further including four feet attached to said bottom plate.

3. A portable cooking apparatus comprising:

a bottom plate having a top, a bottom, a front, a back, a first side, and a second side;

a first vertical bottom portion attached to said first side of said bottom plate;

a first wall attached to said first vertical bottom portion by a first hinge;

a second vertical bottom portion attached to said second side of said bottom plate;

a second wall attached to said second vertical bottom portion by a second hinge;

a third vertical bottom portion attached to said back of said bottom plate;

a third wall attached to said third vertical bottom portion by a third hinge, said third wall removably attached to said first wall and said second wall;

at least one support bar on each of said first wall and said second wall for supporting a cooking grate;

at least one cooking grate fixedly attached to at least one of said support bars, said first wall able to be folded at said first hinge over said bottom plate, said third wall able to be folded at said third hinge over said first wall, and said second wall able to be folded at said second hinge over said third wall for easy portability of the portable cooking apparatus.

4. The portable cooking apparatus defined in claim 3 wherein said second vertical portion is taller vertically than said second vertical bottom portion.

5. The portable cooking apparatus defined in claim 4 wherein at least one support is two supports on each of said first wall and said third wall.

6. The portable cooking apparatus defined in claim 5 wherein said first wall and said second wall are not parallel to each other.

7. The portable cooking apparatus defined in claim 6 and further including four feet attached to said bottom plate.

8. The portable cooking apparatus defined in claim 7 and further including a tray receptacle above said bottom plate and below said cooking grate.

9. A portable cooking apparatus comprising:

a bottom plate having a top, a bottom, a front, a back, a first side, and a second side;

a first vertical bottom portion attached to said first side of said bottom plate;

a first wall attached to said first vertical bottom portion by a first hinge;

a second vertical bottom portion attached to said second side of said bottom plate;

a second wall attached to said second vertical bottom portion by a second hinge;

a third vertical bottom portion attached to said back of said bottom plate, said third vertical bottom portion is taller vertically than said first vertical bottom portion;

a third wall attached to said third vertical bottom portion by a third hinge, said third wall removably attached to said first wall and said second wall;

at least one support bar on each of said first wall and said second wall for supporting a cooking grate;

at least one cooking grate resting on one of said at least one support bars on each of said first wall and said second wall, said first wall able to be folded at said first hinge over said bottom plate, said third wall able to be folded at said third hinge over said first wall, and said second wall able to be folded at said second hinge over said third wall for easy portability of the portable cooking apparatus.

10. The portable cooking apparatus defined in claim 9 wherein said second vertical portion is taller vertically than said second vertical bottom portion.

11. The portable cooking apparatus defined in claim 10 wherein at least one support is two supports on each of said first wall and said third wall.

12. The portable cooking apparatus defined in claim 11 wherein said first wall and said second wall are not parallel to each other.

13. The portable cooking apparatus defined in claim 12 and further including four feet attached to said bottom plate.

14. The portable cooking apparatus defined in claim 13 and further including a tray receptacle above said bottom plate and below said cooking grate.

* * * * *